UNITED STATES PATENT OFFICE 2,596,278

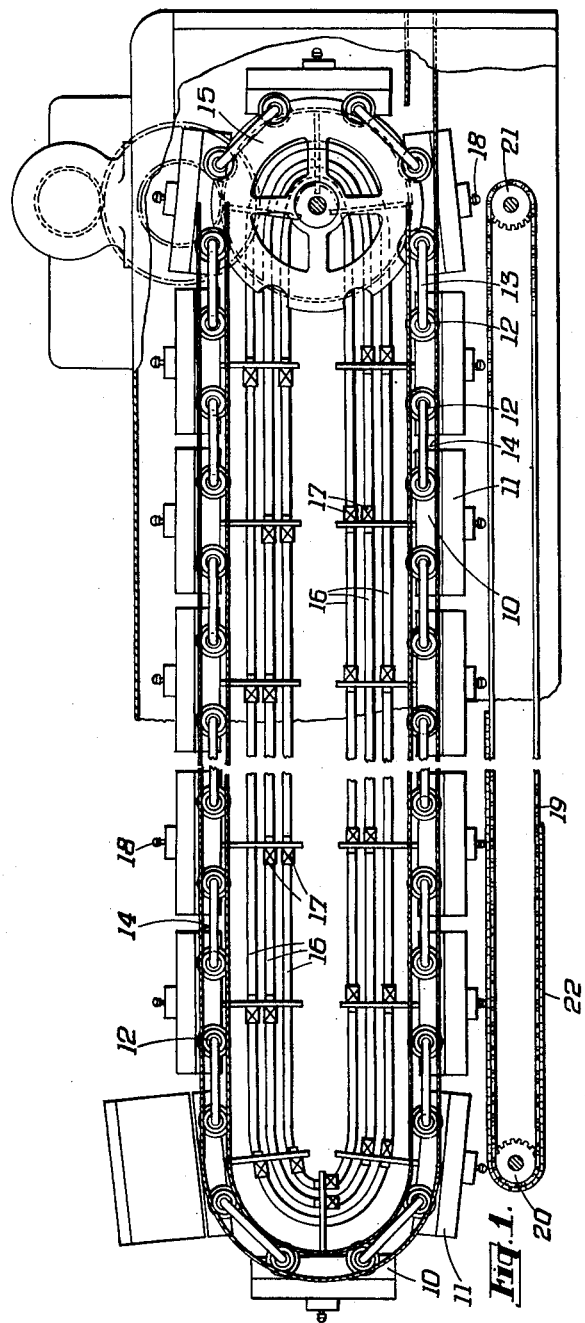

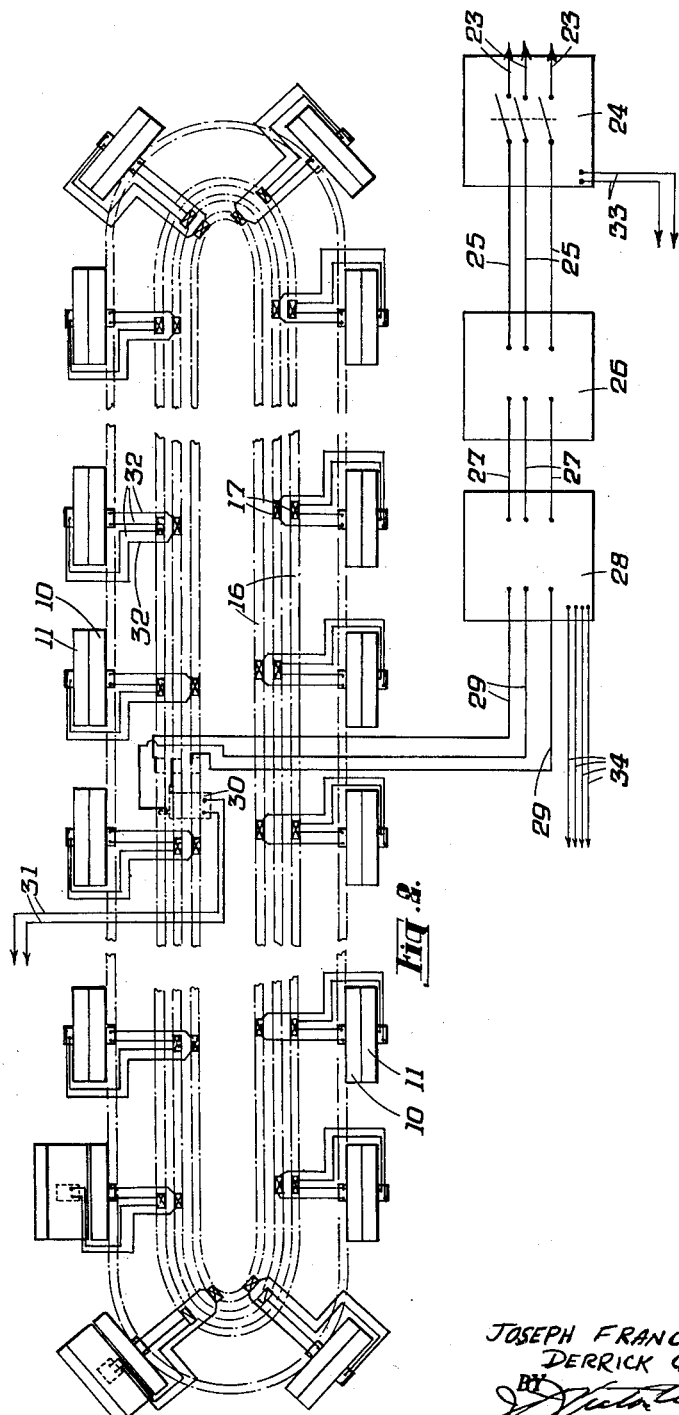

WAFER OVEN

Joseph Francis Naylor and Derrick Greener, Newton-le-Willows, England, assignors to T. & T. Vicars Limited, Newton-le-Willows, England, a British company Application May 15, 1951, Serial No. 226,462
In Great Britain May 31, 1950

3 Claims. (Cl. 219—35)

The present invention relates to an improved oven for the baking of wafers or the like confectionery products by means of a pair of co-operating electrically heated plates.

In order to operate the oven with the plates at a predetermined temperature differential, it is known to provide the plates with a predetermined differential resistance value and to heat both plates from a common source of supply. In order, however, to vary the temperature differential during operation of the machine, it has hitherto been necessary to heat each plate from a separate source of supply.

It is an object of the present invention to provide an oven of the type set forth in which the temperature differential may be varied during operation of the oven, both plates being heated from a common source of supply.

According to the present invention an oven of the type wherein a pair of co-operating plates, to bake for example a wafer therebetween, are heated electrically from a common source of supply, is characterised by the feature that the supply circuit to one of the plates is associated with a control mechanism to intermittently actuate a switch in said circuit to intermittently cut off power to said plate during a part of the period of operation of the oven, whereby the temperature differential of the plates is varied.

The switch is preferably automatically actuated responsive to variation from a predetermined temperature differential of the plates.

The plates are preferably displaceable along an endless track, the said switch being mounted on one of the plates and actuated by a device adjacent the track.

The switch preferably includes a resiliently loaded member, and the device preferably comprises a strip member of adjustable operative length disposed adjacent and parallel to part of the track in a position to contact and depress the resiliently loaded member to actuate the switch during that part of the cycle of displacement of the oven in which the oven passes adjacent the strip member. The strip member preferably comprises a displaceable endless belt having a run adjacent and parallel to the track and carrying a longitudinal raised strip portion over part only of its length, whereby the position of the strip portion relative to the belt (and so relative to the track) may be varied to determine the operative length of said strip portion.

A plurality of interconnected pairs of plates may be mounted on the endless track and actuated in succession by a common device. The source of supply is preferably carried by a triple bus-bar track, each bar carrying one phase of a three-phase current and each succeeding pair of plates being provided with a pair of carbon brushes adapted to contact a different pair of bus-bars.

The invention will be further described by way of example with reference to the accompanying drawings in which:

Fig. 1 is a side elevation of a preferred form of wafer oven according to the present invention, and Fig. 2 is an electrical-circuit diagram for the oven assembly of Fig. 1.

In the drawings pairs of separately electrically heated co-operating plates 10, 11 forming a plurality of separate wafer ovens are mounted on rollers 12 and interconnected by links 13. The rollers ride in a guide channel 14 and around a driving wheel 15 which together define an endless track for the ovens. The driving wheel is suitably rotated, by means not shown, to displace the plates along said endless track. A source of electrical supply for the ovens is fed to a triple bus-bar track, each bus-bar 16 carrying one phase of a three-phase current. Each succeeding oven is provided with a pair of carbon brushes 17 to contact a different pair of bus-bars, whereby to balance the loading on the multi-phase supply. Each plate 11 is provided with a switch, for the heating elements therein, having a resiliently loaded member 18. A displaceable endless belt 19 carried between sprockets 20, 21 has an upper run adjacent and parallel to a lower run of the ovens. The belt 19 has a longitudinal raised strip portion 22 along half of its length. One of the sprockets 20, 21 is rotatable (by means not shown) whereby the position of the strip portion relative to the belt (and so relative to the track) may be varied to determine the operative length of said strip portion.

In the electrical-circuit diagram shown in Fig. 2 of the drawings, leads 23 introduce a three-phase 50 cycle supply to a circuit breaker 24 which is connected by leads 25 to an auto-transformer 26. The auto-transformer 26 is connected by leads 27 to a moving coil induction regulator 28. The moving coil induction regulator 28 is connected to the bus-bars 16 by leads 29 one of which leads 29 passes first through a current transformer 30. The current transformer is connected by leads 31 to a watt meter (not shown).

The brushes 17 are connected by leads 32 to heating elements (not shown) in the plates 10, 11. The leads to the plates 11 pass through the switch referred to hereinbefore and having the resiliently loaded member 18.

Leads 33 in the no-volt circuit of the circuit breaker 24 extend to door switches (not shown) for the oven assembly.

Leads 34 connect the moving coil induction regulator 28 to a watt meter voltage coil (not shown) and to push-button control switches (not shown).

In operation, the driving wheel 15 is rotated to displace the ovens along the endless track. The plates are electrically heated from a common source of supply and means of known type (not shown) periodically operate to raise the plate 11 relative to the plate 10 to enable the ovens to be charged and emptied. The members 18 on the plate 11, during the lower run, contact and are actuated (to temporarily cut off power to the plate 11) by that part of the raised portion 22 which is disposed on the upper run of the belt 19.

It will be appreciated that the time, during which power to the plate 11 is cut off is proportional to the operative length of the raised portion 22. Thus, during operation of the machine, the temperature differential of the plates 10, 11 may be varied.

The operative length of the raised portion 22 may be varied automatically responsive to variation from a predetermined temperature differential of the plate.

We claim:

1. An oven including in combination a pair of co-operating electric heating plates, an endless track, means to displace the plates along said endless track, an electrical supply circuit to said plates, a switch in the supply circuit to one of said plates and mounted on said one plate and having a resiliently loaded member, a strip member disposed adjacent and parallel to part of the track, and means to adjust the operative length of said strip member, said strip member to intermittently contact and depress the resiliently loaded member to actuate the switch during that part of the cycle of displacement of the plates in which the plates pass adjacent the strip member, to intermittently cut off power to said one plate during said part of the cycle of displacement of the plates, whereby the temperature differential of the plates is varied.

2. An oven including in combination a pair of co-operating electric heating plates, an endless track, means to displace the plates along said endless track, an electrical supply circuit to said plates, a switch in the supply circuit to one of said plates and mounted on said one plate and having a resiliently loaded member, an endless belt having a run adjacent and parallel to the track, a longitudinal raised strip portion over part only of the length of the belt, and means to displace the belt to adjust the operative length of said raised portion, said raised portion to intermittently contact and depress the resiliently loaded member to actuate the switch during that part of the cycle of displacement of the plates in which the plates pass adjacent the raised portion, to intermittently cut off power to said one plate during said part of the cycle of displacement of the plates, whereby the temperature differential of the plates is varied.

3. An oven assembly including in combination pairs of co-operating electric heating plates, means to interconnect in series said pairs of plates, an endless track, means to displace the plates along said endless track, an electrical supply circuit to said plates, a switch in the supply circuit to one of each pair of plates and mounted on each said one plate and each having a resiliently loaded member, a strip member disposed adjacent and parallel to part of the track and means to adjust the operative length of said strip member, said strip member to intermittently contact and depress the resiliently loaded members to actuate the switches during that part of the cycle of displacement of the plates in which the plates pass adjacent the strip member, to intermittently cut off power to said one plates during said part of the cycle of displacement of the plates, whereby the temperature differential of the plates is varied.

JOSEPH FRANCIS NAYLOR.
DERRICK GREENER.

REFERENCES CITED

The following references are of record in the file of this patent:

UNITED STATES PATENTS

| Number | Name | Date |
| --- | --- | --- |
| 797,604 | Perky | Aug. 22, 1905 |
| 1,519,287 | Woodson | Dec. 16, 1924 |
| 1,557,004 | Bates | Oct. 13, 1925 |
| 1,584,825 | Tugendhat | May 18, 1926 |
| 2,099,247 | Whitlock | Nov. 16, 1937 |